United States Patent [19]

Nannichi

[11] Patent Number: 5,146,352
[45] Date of Patent: Sep. 8, 1992

[54] READER/RECORDER IN A FACSIMILE MACHINE

[75] Inventor: Toshihiko Nannichi, Fuchu, Japan

[73] Assignee: Kabushiki Kaisha Toshiba, Kawasaki, Japan

[21] Appl. No.: 829,567

[22] Filed: Feb. 5, 1992

Related U.S. Application Data

[63] Continuation of Ser. No. 487,035, Mar. 2, 1990, abandoned.

[30] Foreign Application Priority Data

Mar. 6, 1989 [JP] Japan .................................... 1-53482

[51] Int. Cl.⁵ .............................................. H04N 1/00
[52] U.S. Cl. .................... 358/451; 358/401
[58] Field of Search ............... 358/400, 401, 404, 408, 358/451, 452, 474, 405, 407, 296, 298; 379/100; 346/108

[56] References Cited

U.S. PATENT DOCUMENTS

| | | | |
|---|---|---|---|
| 4,876,604 | 10/1989 | Nobuta | 358/400 |
| 4,970,603 | 11/1990 | Kanai | 358/401 |
| 4,974,097 | 11/1990 | Kanedo et al. | 358/400 |

Primary Examiner—Edward L. Coles, Sr.
Assistant Examiner—Jerome Grant
Attorney, Agent, or Firm—Finnegan, Henderson, Farabow, Garrett and Dunner

[57] ABSTRACT

A reader/recorder in a facsimile machine which is so arranged that, when it is desired to establish a communication with any of facsimile machines belonging to group 3 (G3) or group 4(G4) of the CCITT recommendation, a picture size compatibility can be maintained only by carrying out a reduction processing without an enlargement processing over picture signals.

4 Claims, 8 Drawing Sheets

READER/RECORDER IN A FACSIMILE MACHINE

This application is a continuation of application Ser. No. 07/487,035 filed Mar. 2, 1990, now abandoned.

BACKGROUND OF THE INVENTION

1. Field of the Invention

The present invention relates to a reader and a recorder in a facsimile machine which is capable of maintaining a picture size compatibility between a facsimile machine whose specifications are set to be expressed in terms of an inch unit system with respect to a picture element density in a main-scanning direction and a scanning line density in a sub-scanning direction perpendicular to the main-scanning direction, which is also capable of maintaining the picture size compatibility between a facsimile machine whose specifications are set to be expressed in terms of a metric unit system with respect to the picture element density in the main scanning direction and the scanning line density in the sub-scanning direction, respectively.

2. Description of the Related Art

The specifications of a facsimile machine are standardized as groups 1, 2, 3 and 4 [G1, G2, G3 and G4] by the Comité Consultatif nternational Télégraphique et Téléphonique (nternational Telegraph and Telephone Consultative Committee; which will be referred to merely as the CCTT).

Facsimile machines based on the G3 and G4 specifications handle picture signals in the form of digital data. The picture resolutions of the facsimile picture resolutions in accordance with the G4 specifications are expressed based o the inch unit system. For this reason, when it is desired to transmit a picture signal to a G4 facsimile machine from a G3 facsimile machine which has a G4 facsimile communication procedure and can communicate with the G4 facsimile machine, or when it is desired to transmit it to a G3 facsimile machine from a G4 facsimile machine which has a G3 facsimile communication procedure and can communicate with the G3 facsimile machine; a picture resolution transformation between the metric and inch unit systems is carried out usually at the time of reading an original document.

Take the picture resolution of the G3 facsimile machine for instance. Then the pixel density in the main scanning direction is set at 8 pixels/mm and the scanning-line density in the sub-scanning direction is set at 7.7 lines/mm. In the case of the picture resolution of the G4 facsimile machine, on the other hand, the pixel and scanning-line densities are set at 200 pixels/inch in the main scanning direction and at 200 lines/inch in the sub-scanning direction respectively.

For this reason, when it is desired to transmit a picture signal from a G3 facsimile machine having the G4 facsimile communication procedure to a G4 facsimile machine, the pixel density in the main scanning direction must be transformed from 8 pixels/mm to 200 pixels/inch (200 pixels/25.4 mm). To this end, the picture signal is only required to be subjected at the side of the G3 facsimile machine to a reduction processing having such a reduction factor as shown by the following equation (1), thus providing a picture having the same size as at the G4 machine side with respect to the main scanning direction.

$$(\frac{1}{8})/(25.4/200) = 250/254 (=98.43\%) \qquad (1)$$

With regard to the sub-scanning direction, the scanning-line density must be transformed from 7.7 lines/mm to 200 lines/inch (200 lines/25.4 mm). This can be attained by performing an enlargement processing having such an enlargement factor as shown by the following equation (2) at the side of the G3 facsimile machine to thereby provide a picture having the same size as at the side of the G4 facsimile machine with respect to the sub-scanning direction.

$$(1/7.7)/(25.4/200) = 10000/9779 (=102.26\%) \qquad (2)$$

Conversely, when it is desired to transmit a picture signal from the G4 facsimile machine having the G3 facsimile communication procedure to the G3 facsimile machine, it is necessary to transform the pixel density of the main scanning direction from 200 pixels/inch (200 pixels/25.4 mm) to 8 pixels/mm, for which purpose the picture signal is only required to be subjected to an enlargement processing having such a factor as shown by the following equation (3) at the side of G4 facsimile machine, thus yielding a picture having the same size as at the side of the G3 facsimile machine with respect to the main scanning direction.

$$(25.4/200)/(\frac{1}{8}) = 254/250 (=101.60\%) \qquad (3)$$

It is also necessary to transform the scanning line density of the sub-scanning direction from 200 lines/inch (200 lines/25.4 mm) to 7.7 lines/mm. This can be attained only by performing a reduction processing having such a reduction factor as shown by the following equation (4) at the side of the G4 facsimile machine to obtain a picture having the same size as at the side of the G3 facsimile machine with respect to the sub-scanning direction.

$$(25.4/200)/(1/7.7) = 9779/10000 (=97.79\%) \qquad (4)$$

Referring to FIGS. 7(a) to 7(d), there are shown enlargement and reduction factors which are used when a picture signal is transferred between two facsimile machines respectively.

More in detail, FIG. 7(a) shows a processing state when a picture signal is transmitted from a G4 facsimile machine of specifications both based on the inch unit system with respect to the both main-scanning and sub-scanning directions to a G3 facsimile machine of specifications based on the metric unit system with respect to the both main-scanning and sub-scanning directions. The G4 facsimile machine performs a 101.60% enlargement processing with respect to the main scanning direction while performing a 97.79% reduction processing with respect to the sub-scanning direction, and then transmits the picture signal to the G3 facsimile machine.

FIG. 7(b) shows a processing state when a picture signal is transmitted from the G4 facsimile machine of specifications both based on the inch system with respect to the both main-scanning and sub-scanning directions to another G4 facsimile machine of the sam type. The picture signal is not subjected to any enlargement or reduction processing with respect to the both directions at the sender facsimile machine, and then transmitted as it is to the receiver one.

FIG. 7(c) shows a processing state when a picture signal is transmitted from the G3 facsimile machine of specifications both based on the metric system with respect to the both main-scanning and sub-scanning directions to the G4 facsimile machine of specifications based on the inch system with respect to the both main-scanning and sub-scanning directions. The G3 facsimile machine performs a 98.43% reduction processing with respect to the main scanning direction while performing a 102.26% enlargement processing with respect to the sub-scanning direction, and then transmits the picture signal to the G4 facsimile machine.

FIG. 7(d) shows a processing state when a picture signal is transmitted from the G3 facsimile machine of specifications both based on the metric system with respect to the both main-scanning and sub-scanning directions to another G3 facsimile machine of the same type. The picture signal is not subjected to any enlargement or reduction processing with respect to the both directions at the sender facsimile machine, and then transmitted as it is to the receiver one.

Such enlargement and reduction processings have been so far carried out to realize a picture resolution transformation with respect to the main scanning direction by changing the magnifying factor of an optical reading system and also to realize a picture resolution transformation with respect to the sub-scanning direction by changing the ratio of gears sub-scanning a transmission original sheet in the sub-scanning direction. The employment of this method, however, has involved the complicated optical and mechanical arrangement, thus leading to a high manufacturing cost.

Further, there has been known an arrangement for electrically reducing or enlarging a picture with respect to the main-scanning direction in order to relatively reduce the costs required.

An arrangement for electrically reducing or enlarging a picture with respect to the main scanning direction is shown in FIG. 8.

First of all, in the case of reducing a picture, a binary picture signal is inputted to a thin-out sampling circuit 101. The circuit 101, when sequentially receiving the components of the picture signal corresponding to pixels arranged in the main scanning direction, thins out a predetermined number of components from the picture signal at predetermined constant intervals and outputs the picture signal being not thinned-out. When a reduction factor is 98% for example, it is required to reduce every 50 pixels to 49 pixels and thus to remove one component corresponding to one pixel from every 50 components of the picture siqnal corresponding to 50 pixels.

In the case of enlarging a picture, a picture signal is applied to an interpolation processing circuit 102. The circuit 102, when sequentially receiving the components of the picture signal corresponding to pixels arranged in the main scanning direction, interpolates the picture signal at predetermined constant intervals and outputs an interpolated picture signal. When an enlargement factor is 102% for example, it is required to enlarge every 50 pixels to 51 pixels and thus to add one component corresponding to one pixel to every 50 components of the picture signal corresponding to 50 pixels. In this connection, the value of a picture signal component to be interpolated may be a value obtained through linear interpolation based on the value of a picture signal component adjacent to the former picture signal component or may be the same value as the value of a picture signal component previous by one component thereto. In either case, it is necessary to provide a memory 103 for once storing therein the picture signal inputted to the interpolation processing circuit 102.

In the case of electrically reducing a picture with respect to the sub-scanning direction, it is required to thin out a predetermined number of lines from lines of the picture signal arranged in the sub-scanning direction; whereas, in the case of enlarging a picture with respect to the sub scanning direction, it is required to interpolate the picture signal at predetermined line intervals.

Since the reduction processing means to convert a data quantity to a less one, the degree of deterioration in the picture data may be small. However, the enlargement processing means to convert a data quantity to a larger one and this requires the prediction of the value of a data quantity, thus inevitably causing the deterioration of the picture data.

As has been mentioned above, since the prior art facsimile machines have been arranged so that the G3 facsimile machine has specifications of the metric unit system both with respect to the main-scanning and sub-scanning directions while the G4 facsimile machine has specifications of the inch unit system with respect Lo the both directions, which has resulted in that when it is desired to transfer a picture signal between different-group facsimile machines, this requires both the enlargement and reduction processings.

In addition, the necessity of use of the enlargement processing to convert a data quantity to a larger one has disadvantageously involved the inevitable deterioration of the picture data.

SUMMARY OF THE INVENTION

It is an object of the present invention to provide a reader/recorder in a facsimile machine which is capable of maintaining a picture size compatibility between communicating facsimile machines only by performing a reduction processing over a picture signal and can eliminate the need for any enlargement processing, when transmitting the picture signal between facsimile machines belonging to different specification groups.

In accordance with an aspect of the present invention, there is provided a reader in a facsimile machine wherein specifications of the reader are set to be expressed in terms of pixels/mm based on a metric unit system with respect to a main scanning direction and in terms of lines/inch based on an inch unit system with respect to a sub scanning direction perpendicular to the main scanning direction, and wherein when a picture signal outputted from the reader is transmitted to a recorder of a facsimile machine having specifications based on the same unit system with respect to both of the main-scanning and sub-scanning directions, the reader performs a reduction processing over the picture signal with respect to either one of the main-scanning and sub-scanning directions.

Namely, when the picture signal outputted from the reader is transmitted to a facsimile machine having a recorder of the metric unit system with respect to both of the main-scanning and sub-scanning directions, the reader performs the reduction processing over the picture signal with respect to the sub-scanning direction, and when the picture signal outputted from the reader is transmitted to a facsimile machine having a recorder of the inch unit system with respect to both of the main-scanning and sub-scanning directions, the reader performs the reduction processing over the picture signal with respect to the main-scanning direction.

In accordance with another aspect of the present invention, there is provided a recorder in a facsimile machine wherein specifications of the recorder are set to be expressed in terms of pixels/inch based on the inch unit system with respect to the main-scanning direction and in terms of lines/mm based on the metric unit system with respect to the sub-scanning direction, and wherein when a picture signal transmitted from a reader of a facsimile machine having specifications based on the same unit system with respect to both the main-scanning and sub-scanning directions is inputted to the recorder, the recorder performs the reduction processing over the picture signal with respect to either one of the main-scanning and sub-scanning directions.

Namely, when a picture signal transmitted from a reader of a facsimile machine having specification based on the metric unit system with respect to both the main-scanning and sub-scanning directions is inputted to the recorder, the recorder performs the reduction processing over the picture signal with respect to the main-scanning direction, and when a picture signal transmitted from a reader of a facsimile machine having specification based on the inch unit system with respect to both the main-picture scanning and sub-scanning directions is inputted to the recorder, the recorder performs the reduction processing over the picture signal with respect to the sub-scanning direction.

In this way, in accordance with the present invention, even if a picture is transmitted to or received from a facsimile machine having specifications based on the metric or inch unit system with respect to both of the main-scanning and sub-scanning directions, a picture size compatibility can be secured between communicating parties by performing a reduction processing over the picture to be transmitted or received with respect to either one of the main-scanning and sub-scanning directions.

Further, in accordance with still another aspect of the present invention there is provide a reader/recorder in a facsimile machine wherein, when a picture signal is transmitted from a first facsimile machine having a reader of the metric unit system with respect to the main-scanning direction and of the inch unit system with respect to the sub-scanning direction to a second facsimile machine having a recorder of the inch unit system with respect to the main-scanning direction and of the metric unit system with respect to the sub-scanning direction, the reader/recorder performs the reduction processing over the picture signal with respect to both of the main-scanning and sb-scanning directions in either one of the first and second facsimile machines.

In accordance with the present invention, when a facsimile communication procedure is carried out between the first and second facsimile machines, a user data indicative of the specifications of the reader of the first facsimile machine is exchanged with a user data indicative of the specifications of the recorder of the second facsimile machine.

Further, in accordance with the present invention, when a picture signal is transmitted to the first facsimile machine having the reader of the metric unit system with respect to the main scanning direction and of the inch unit system with respect to the sub-scanning direction or received from the second facsimile machine having the recorder of the inch unit system with respect to the main scanning direction and of the metric unit system with respect to the sub scanning direction, the picture size compatibility can be maintained between the first and second facsimile machines by reducing the picture signal with respect to both of the main-scanning and sub-scanning directions.

Therefore, the present invention can eliminate the need for any enlargement processing even for any sort of communication party and thus can avoid the deterioration of picture data caused by the enlargement processing. In addition, since the present invention requires only a reduction processing circuit, the circuit configuration can be simplified and the cost can be made low.

DESCRIPTION OF THE PREFERRED EMBODIMENTS

Figure 1A:
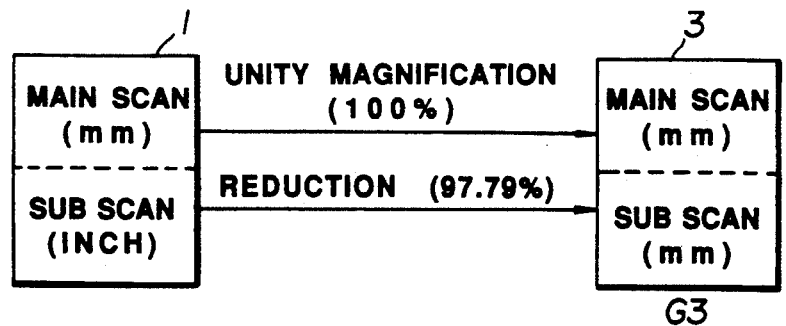
FIGS. 1(a) to 1(e) are diagrams for explaining the operation of an embodiment of a reader and a recorder in a facsimile machine according to the present invention.

Preferred embodiments of the present invention will be detailed by referring to the attached drawings.

Referring first to FIGS. 1(a) to 1(e), there are shown reduction factors at which communication of picture images are carried out between two facsimile machines based on a reader and a recorder in a facsimile machine in accordance with an embodiment of the present invention.

In the drawing, there are provided four facsimile machines 1 to 4. The first facsimile machine 1 is based on facsimile communication procedures G3 and G4 and also has a reader whose main scanning direction specification is set to be expressed as 8 pixels/mm based on a metric unit system and whose sub scanning direction specification is set as 200 lines/inch (200 lines/25.4 mm) based on an inch unit system.

The second facsimile machine 2 similarly is based on facsimile communication procedures G3 and G4 and also has a recorder whose main scanning direction specification is set to be expressed as 200 pixels/inch (200 pixels/25.4 mm) based on the inch system and whose sub-scanning direction specification is set as 7.7 lines/mm based on the metric system.

The third facsimile machine 3 is based on a facsimile communication procedure G3, and also has a reader and a recorder whose specifications with respect to the main-scanning and sub-scanning directions are set both based on the same metric system respectively. More in detail, for both of the reader and recorder, the main scanning direction specification is set at 8 pixels/mm and the sub scanning direction specification is set at 7.7 lines/mm.

The fourth facsimile machine 4 is based on a facsimile communication procedure G4 and has a reader and a recorder whose main-scanning and sub-scanning direction specifications are set both based on the same inch system. More in detail, for both of the reader and recorder, the main scanning direction specification is set at 200 pixels/inch (200 pixels/25.4 mm) and the sub scanning direction specification is set at 200 lines/inch (200 pixels/25.4 mm).

FIG. 1(a) shows the processing state when a picture signal is transmitted from the first facsimile machine 1 to the G3 facsimile machine 3, in which since the first and third facsimile machines 1 and 3 have the main scanning direction specifications based on the same metric system, the picture signal is transmitted without being subjected to any magnifying/reducing processings in the main scanning direction, that is, with a magnification factor of 1. The specification of the first facsimile machine 1 with respect to the sub-scanning direction is set based on the inch system, while the specification of the G3 facsimile machine 3 with respect to the sub-scanning direction is set based on the metric system. As a result, the first facsimile machine 1 subjects the picture signal to a reduction processing of such a reduction factor as shown by the aforementioned equation (4), that is, to a 97.79% reduction processing with respect to the sub-scanning direction and then sends it to the G3 facsimile machine 3.

Figure 1B:
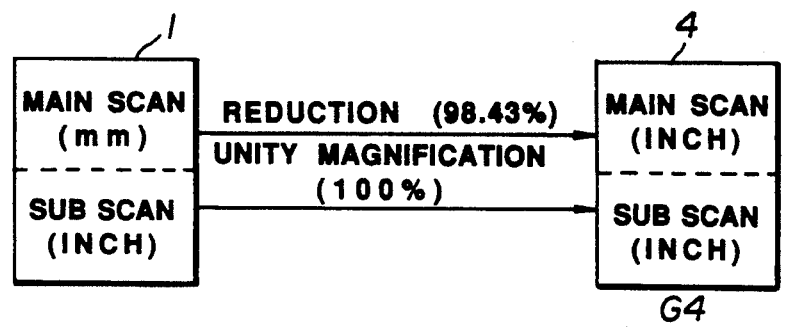

FIG. 1(b) shows the processing state when a picture signal is transmitted from the first facsimile machine 1 to the G4 facsimile machine 4, wherein since the first and fourth facsimile machines 1 and 4 have the sub-scanning direction specifications based on the same inch system, the picture signal is transmitted without being subjected to any magnifying/reducing processings in the sub-scanning direction, that is, with a magnification factor of 1. The specification of the first facsimile machine 1 with respect to the main scanning direction is set based on the metric system, while the specification of the G4 facsimile machine 4 with respect to the main scanning direction is set based on the inch system. As a result, the first facsimile machine 1 subjects the picture signal to a reduction processing of such a reduction factor as shown by the aforementioned equation (1), that is, to a 98.43% reduction processing with respect to the main scanning direction and then sends it to the G4 facsimile machine 4.

In this way, in such cases as shown in FIGS. 1(a) and 1(b), the first facsimile machine 1 as a sender performs a reduction processing function over the sending picture signal with respect to either one of the main scanning and sub-scanning directions to maintain a picture size compatibility with either one of the G3 and G4 facsimile machines 3 and 4 as a receiver.

Figure 1C:
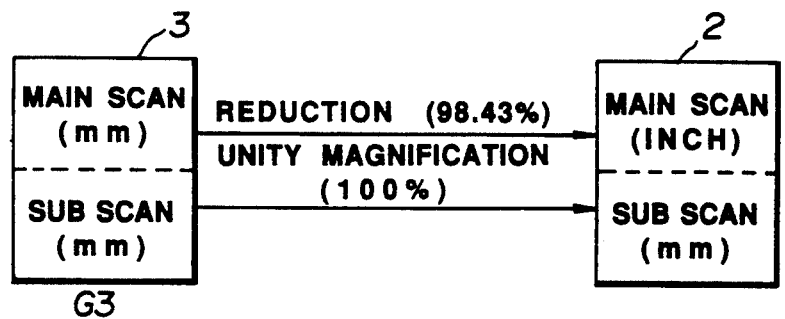

FIG. 1(c) shows the processing state when a picture signal is transmitted from the G3 facsimile machine 3 to the second facsimile machine 2, in which since the G3 and second facsimile machines 3 and 2 have the sub-scanning direction specifications based on the same metric system, the picture signal is transmitted without being subjected to any magnifying/reducing processings in the sub-scanning direction, that is, with a magnification factor of 1. The specification of the G3 facsimile machine 3 with respect to the main scanning direction is set based on the metric system, while the specification of the second facsimile machine 2 with respect to the main scanning direction is set based on the inch system. As a result, the second facsimile machine 2 receives the picture signal from the G3 facsimile machine 3, and then subjects the received picture signal to a reduction processing of such a reduction factor as shown by the aforementioned equation (1), that is, to a 98.43% reduction processing with respect to the main scanning direction.

Figure 1D:
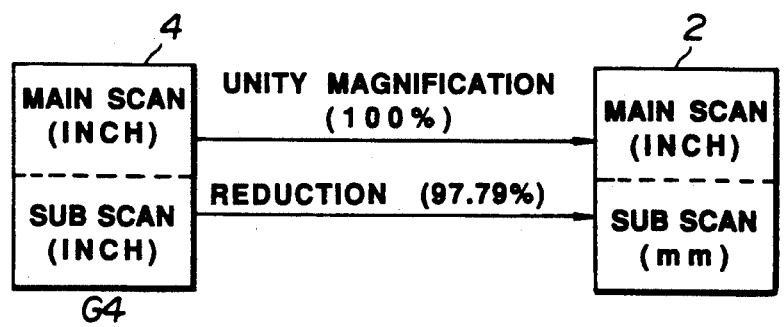

FIG. 1(d) shows the state when a picture signal is transmitted from the G4 facsimile machine 4 to the second facsimile machine 2, in which since the fourth and second facsimile machines 4 and 2 have the main-scanning direction specifications based on the same inch system, the picture signal is transmitted without being subjected to any magnifying/reducing processings with respect to the main scanning direction, that is, with a magnification factor of 1. The specification of the G4 facsimile machine 4 with respect to the sub-scanning direction is set based on the inch system, while the specification of the second facsimile machine 2 with respect to the sub-scanning direction is set based on the metric system. As a result, the second facsimile machine 2 receives the picture signal from the G4 facsimile machine 4, and then subjects the received picture signal to a reduction processing of such a reduction factor as shown by the aforementioned equation (4), that is, to a 97.79% reduction processing with respect to the sub-scanning direction.

In this way, in such cases as shown in FIGS. 1(c) and 1(d), the second facsimile machine 2 as a receiver performs a reduction processing function over the received picture signal with respect to either one of the main scanning and sub-scanning directions to maintain a picture size compatibility with either one of the G3 and G4 facsimile machines 3 and 4.

Figure 1E:
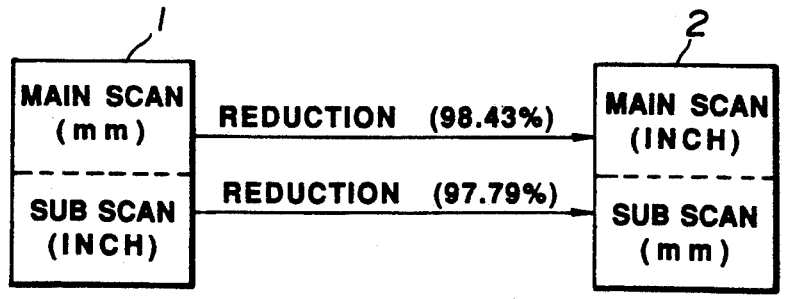

FIG. 1(e) shows the state when a picture signal is transmitted from the first facsimile machine 1 to the second facsimile machine 2, in which since the first facsimile machine 1 has the main-scanning direction specification based on the metric system and the second facsimile machine 2 has the main-scanning direction specification based on the inch system, the picture signal must be subjected to a reduction processing of such a reduction factor as shown by the aforementioned equation (1), that is, to a 98.43% reduction processing with respect to the main scanning direction at either one of the first and second facsimile machines 1 and 2. The specification of the first facsimile machine 1 with respect to the sub-scanning direction is set based on the inch system, while the specification of the second facsimile machine 2 with respect to the sub scanning direction is set based on the metric system. As a result, either one of the first and second facsimile machines 1 and 2 must perform a reduction processing of such a reduction factor as shown by the aforementioned equation (4), that is, to a 97.79% reduction processing with respect to the sub-scanning direction.

Accordingly, in such a case as shown in FIG. 1(e), either one of the first facsimile machine 1 as a transmitter and the second facsimile machine 2 as a receiver can perform a reduction processing function over the picture signal with respect to the main scanning and sub-scanning directions to maintain a picture size compatibility between the transmitter and receiver.

In accordance with the reader/recorder of the present embodiment, in this way, even when a picture signal is transmitted from the first facsimile machine 1 to the G3 or G4 facsimile machine, from the G3 or G4 facsimile machine to the second facsimile machine 2, or from the first facsimile machine 1 to the second facsimile machine 2; the picture size compatibility between the transmitter and receiver can be secured only by subjecting the picture signal to a reduction processing, thus eliminating the need for an enlargement processing.

In the present embodiment, explanation has been made in connection with a specific example in which the pixel density and scanning-line density are 8 pixels/mm and 7.7 lines/mm in metric units and are 200 pixels/inch and 200 lines/inch in inch units respectively. However, the present invention is not limited to the specific example. For example, in the case where the pixel and scanning-line densities are set at 8 pixels/mm and 3.85 lines/mm in metric units and are at 200 pixels/inch and 200 lines/inch in the inch units, respectively, a reduction processing may have such a reduction factor as shown by the aforementioned equation (1) with respect to the main scanning direction, while each line in the metric system is repeated twice to convert 3.85 lines/mm into 7.7 lines/mm and then be subjected to a reduction processing of such a reduction factor as shown by the equation (4) with respect to the sub-scanning direction. With regard to the sub-scanning direction, further, one line may sequentially removed at a rate of one line out of every 2 lines, that is, lines may be so called "thinned out" to convert 200 lines/inch into 100 lines/inch in inch system and then be subjected to a reduction processing of such a reduction factor as shown by the equation (4).

Also, in the case where the pixel and scanning line densities are set at 8 pixels/mm and 7.7 lines/mm in the metric system and at 400 pixels/inch and 400 lines/inch in the inch system, respectively; pixels may be sequentially thinned out at a rate of one pixel out of every 2 pixels in the inch system to convert 400 pixels/inch into 200 pixels/inch with respect to the main scanning direction, lines may be sequentially thinned out at a rate of one line out of every 2 lines in the inch system to convert 400 lines/inch into 200 lines/inch while with respect to the sub-scanning direction, after which the picture signal may be subjected to suitable reduction processings of such factors as shown by the equations (1) and (4) with respect to the main-scanning and sub-scanning directions. In this connection, further, each pixel in the metric system may be repeated twice to convert 8 pixels/mm into 16 pixels/mm with respect to the main scanning direction, while each line in the metric system may be repeated twice to convert 7.7 lines/mm into 15.4 lines/mm with respect to the sub scanning direction, after which the picture signal may be subjected to reduction processings of such reduction factors as shown by the equations (1) and (4) with regard to the main-scanning and sub-scanning directions.

In this way, according to the present embodiment, regardless of the values of the pixel and scanning-line densities in metric units and of the values of the pixel and scanning-line densities in inch units, the picture signal may be subjected to always reduction processings of such reduction factors as shown by the equations (1) and (4) and can eliminate the need for being subjected to enlargement processings of such enlargement factors as shown by the equations (2) and (3). As a result, it will be clear that the present invention can be simplified in processing when compared with the prior art.

Figure 2:
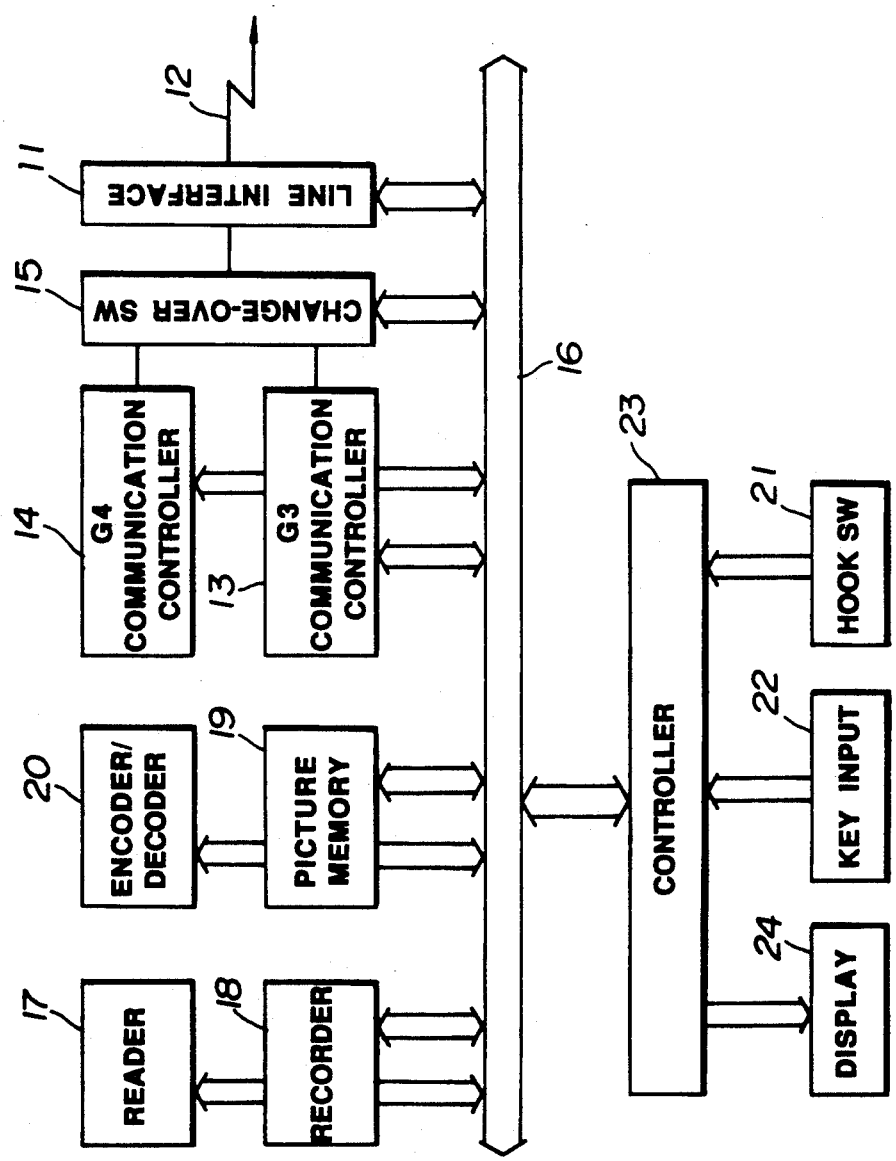
FIG 2 is a block diagram showing a facsimile machine to which the present embodiment is applied.

Shown in FIG. 2 are the schematic arrangements of the first and second facsimile machines 1 and 2 used in FIG. 1, wherein a line interface 11 is connected to an ISDN line 12 leading to an Integrated Services Digital Network (hereinafter, sometimes referred to merely as the ISDN) to carry out an interconnection control procedure, a disconnection control procedure and so on to the ISDN.

More specifically, one of G3 and G4 communication controllers 13 and 14 is connected through a change-over switch 15 to the line interface 11. The G3 communication controller 13, when connected through the change-over switch 15 to the line interface 11, can execute the G3 facsimile communication procedure with the party communication terminal through the SDN. The G4 communication controller 14, when connected through the change-over switch 15 to the line interface 11, can carry out the G4 facsimile communication procedure with the party communication terminal through the ISDN. A bus 16 is provided to transfer such data to be received or transmitted as picture data, control data and so on therethrough.

A reader 17 reads out a picture signal from an original document and sequentially sends the read signal out onto the bus 16 to transmit the read picture signal. A recorder 18 sequentially receives a picture signal from the bus 16 and records on a recording paper sheet the associated picture corresponding to the received picture signal. The picture signal sent from the reader 17 onto the bus 16 is once stored in a picture memory 19 so that an encoder/decoder 20 converts the picture signal stored in the memory 19 into a coded signal and then sends out the coded picture signal onto the bus 16. The coded picture signals is sent through one of the G3 and G4 communication controllers 13 and 14 to the SDN and further to the party communication terminal to be received thereat. Meanwhile, a coded picture signal transmitted from the party communication terminal through the ISDN is received at the G3 or G4 communication controller 13 o 14 and then applied onto the bus 16. The coded picture signal is once stored in the picture memory 19 so that the encoder/decoder 20 decodes the same coded picture signal in the memory 19 into the original (non-coded) picture signal and then sends it onto the bus 16. The original picture signal is received at the recorder 18 as its input and recorded on a recording paper in the form a picture image.

A hook switch 21 is used to put the facsimile machine in its on hook or off-hook state through the intervention of an operator. A key input 22 is operated through the operator when he desires to input various sorts of data or instruct various sorts of functions. A controller 23 plays a role of performing general control over the associated facsimile machine. More in detail, the controller 23 executes its signal transmitting operation in response to an operation of the key input 22 or hook switch 21, executes its signal receiving operation in a signal reception mode, and indicates on a display 24 a message to prompt the operator to input a data.

Figure 3:
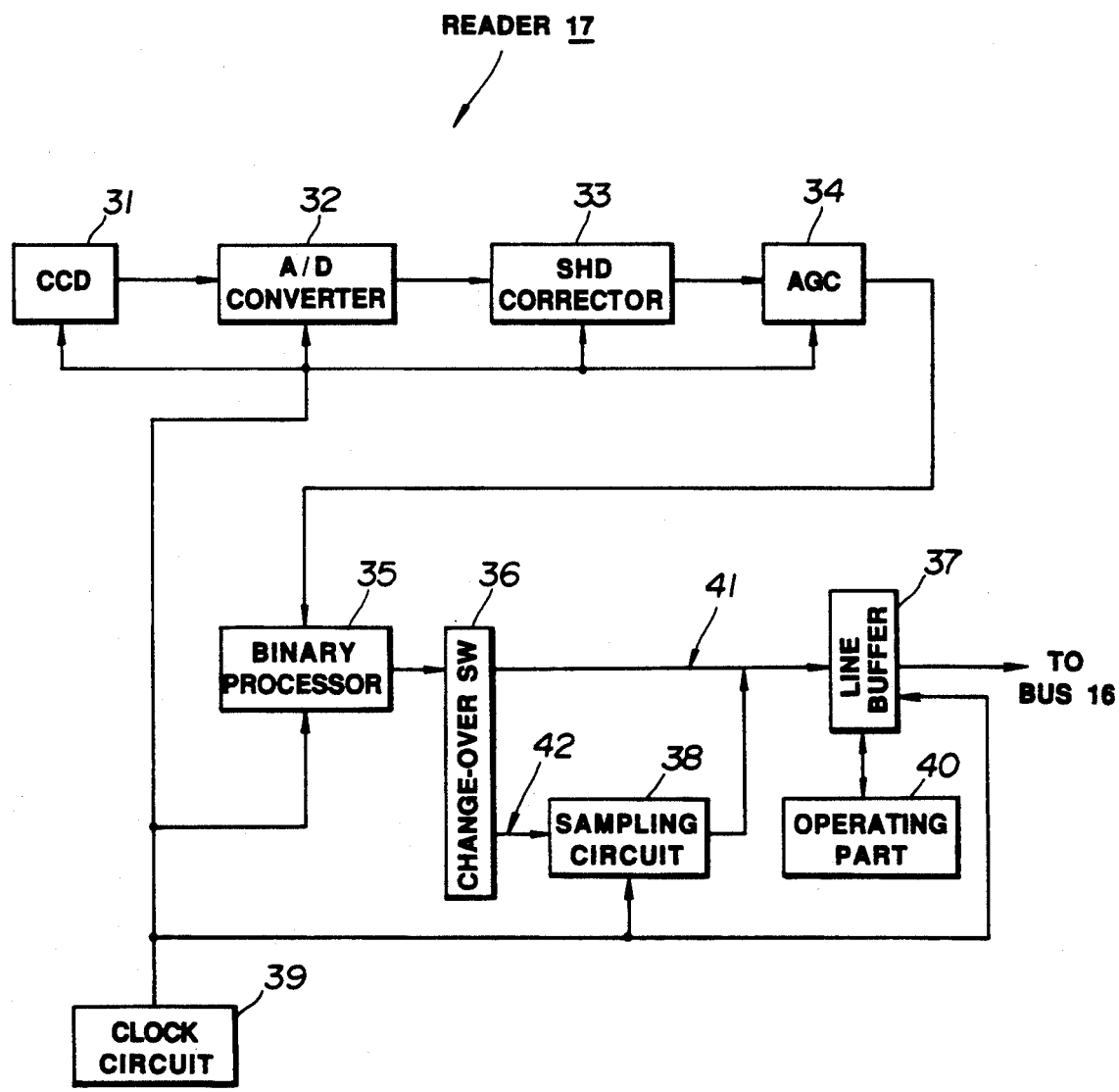
FIG. 3 is a block diagram of a reader used in the facsimile machine of FIG. 2.

Referring to FIG. 3, there is shown detailed arrangement of the reader 17, which reads an original document to be transmitted at a pixel density of 8 pixels/mm in the metric system with respect to the main scanning direction and at a scanning line density of 200 lines/inch in the inch system with respect to the sub-scanning direction.

In the drawing, more specifically, a charge coupled device (CCD) 31 is provided to optically read the transmission original document on a line-by line basis and outputs to an analog-to-digital converter (A/D converter) 32 an analog signal having a level corresponding to the brightness of the read picture. The A/D converter 32, when receiving the analog signal, functions to identify the received analog picture signal by a plurality of predetermined threshold values, convert the analog signal into a multi valued picture signal, and output the multi-valued picture signal to a shading correction circuit (SHD corrector) 33. The SHD corrector 33, when receiving the multi valued picture signal from the A/D converter 32, removes from the multi-valued picture signal its components corresponding to the shading distortion caused by variations in the light quantity of a light source such as a fluorescent lamp irradiating the transmission original document and then sends a multi-valued picture signal subjected to the correction to an automatic gain control circuit (AGC circuit) 34. The corrected multi valued picture signal is level-adjusted through the passage of the AGC circuit 34 and then sent therefrom to a binary processor 35. The binary processor 35, when receiving the multi-valued picture signal, identifies the multi-valued picture signal by a predetermined threshold value, converts it into a binary picture signal indicative of two values, and then sends it to a change-over switch 36. More in detail, the binary picture signal indicates a picture transmitted at a pixel density of 8 pixels/mm in the metric system with respect to the main scanning direction and at a scanning line density of 200 lines/inch in the inch system with respect to the sub scanning direction.

The binary picture signal is passed through the change-over switch 36 and then transmitted through either one of two transmission paths 41 and 42. The transmission path 41 starts with the switch 36, passes through a line buffer 37, and ends with the bus 16 shown in FIG. 2; whereas the transmission path 42 starts with the change over switch 36, passes through a sampling circuit 38 and through the line buffer 37, and ends with the bus 16. A series of such processing operations and signal transmitting operations are carried out in synchronism with a clock signal which s issued from a clock circuit 39.

In the case where it is desired to subject the binary output picture signal of the binary processor 35 to no reduction processing with respect to both of the main-scanning and sub-scanning directions, the controller 23 in FIG. 2 controls the change-over switch 36 in such a manner that the switch 36 is changed over to establish the first transmission path 41 and thus the binary picture signal is transmitted from the switch 36 through the line buffer 37 to the bus 16. This results in that the picture signal can indicate a signal transmitted at a pixel density of 8 pixels/mm in the metric system with respect to the main scanning direction and at a scanning line density of 200 lines/inch in the inch system with respect to the sub-scanning direction, while not subjected to any change of its picture resolution.

When it is desired to reduce the output picture signal of the binary processor 35 with respect to the main scanning direction and not to reduce it with respect to the sub-scanning direction, as shown in FIG. 1(a); the controller 23 controls the reader 17 in such a manner that the sampling circuit 38 is activated and the change over switch 36 is changed to establish the second transmission path 42 to thereby input the picture signal to the sampling circuit 38. The sampling circuit 38, when receiving the picture signal from the switch 36, performs, in synchronism with the clock signal from the clock circuit 39, such a series of operations that sequentially remove a picture signal component corresponding to one pixel with respect to each of the first 8 consecutive groups each consisting of 50 pixels and then do not remove any picture signal components with respect to the subsequent 100 pixels. Such a series of operations are repeated so that 16 pixels are removed from a total of 1000 pixels. In this case, its reduction factor becomes (1000−16)/1000=0.984 (=98.4%) and thus there is carried out such a reduction processing that is substantially the same as in the case having such a reduction factor of 98.43% as shown by the equation (1). The picture signal, which has been subjected to the reduction processing with respect to the main scanning direction in this way but has not been subjected to any reduction processing with respect to the sub-scanning direction, is sent from the sampling circuit 38 through the line buffer 37 to the bus 16. This results in that the picture signal is displayed in the form of a picture image at a pixel density of about 200 pixels/inch in the main scanning direction and at a scanning line density of 200 lines/inch in the sub-scanning direction.

In the case where it is desired not to reduce the picture signal issued from the binary processor 35 in the main scanning direction and to reduce the same signal in the sub-scanning direction as shown in FIG. 1(b), the controller 23 acts to activate an operating part 40 and also to shift the change-over switch 36 to the first transmission path 41 side for inputting the picture signal to the line buffer 37 in the reader 17. The line buffer 37 in turn, when receiving the picture signal, once stores a part of the received picture signal corresponding to several lines on a sub-scanning-direction line basis and sequentially outputs the already stored lines of the picture signal in the first stored order. The operating part 40, in synchronism with the cock signal from the cock circuit 39, erases successively 9 times the picture signal corresponding to one line out of every 50lines of the sub-scanning direction from the line buffer 37 and then erases the picture signal corresponding to one line out of the subsequent 25 lines from the line buffer 37. Such a series of erasing operations are repeated twice to thin out at a rate of 22 lines out of every 1000 lines. In this case, its reduction factor becomes (1000−22)/1000=0.978 (=97.8%) and thus there is carried out such a reduction processing that is substantially the same as in the case having such a reduction factor of 97.79% as shown by the equation (4). The picture signal, which has been subjected to the reduction processing with respect to the sub-scanning direction in this way but has not been subjected to any reduction processing with respect to the main scanning direction, is sent from the line buffer 37 to the bus 16. This results in that the picture signal is displayed in the form of a picture image at a pixel density of 8 pixels/mm in the main scanning direction and at a scanning line density of about 7.7 lines/mm in the sub-scanning direction.

Further, in the event where it is desired to reduce the picture signal issued from the binary processor 35 in the main scanning direction and to reduce the same signal also in the sub-scanning direction as shown in FIG. 1(e), the controller 23 acts to activate the sampling circuit 38 and operating part 40 and also to shift the change-over switch 36 to the second transmission path 42 side for inputting the picture signal to the sampling circuit 38. The sampling circuit 38 repeats such a series of operations that sequentially thin out 16 pixels out of every 1000 pixels as mentioned above so that the picture signal is subjected to the reduction processing with respect to the main scanning direction, and outputs the picture signal to the line buffer 37. The picture signal is then sent from the line buffer 37 to the operating part 40. The operating part 40 repeats such a series of operations that sequentially thin out 22 lines out of every 1000 lines as mentioned above so that the picture signal is subjected to the reduction processing with respect to the sub-scanning direction and then outputted. As a result, the picture signal is subjected to the reduction processings both in the main-scanning and sub-scanning directions and then is transmitted onto the bus 16, which leads to the fact that the picture signal is displayed in the form of a picture image at a pixel density of about 200 pixels/inch in the main scanning direction and at a scanning line density of about 7.7 lines/mm in the sub-scanning direction.

As explained in the foregoing, the reader 17 outputs the picture signal, which is indicative of the picture image to be displayed at a pixel density of 8 pixels/mm with respect to the main scanning direction and at a pixel density of 200 pixels/inch with respect to the sub-scanning direction, from the binary processor 35, and transmits the picture signal as not being subjected to any reduction processing with respect to either one of the main-scanning and sub-scanning directions or transmits the picture signal as being subjected to the reduction processings with respect to the both directions. As a result, there can be selectively transmitted not only the picture signal which is indicative of the picture image to be displayed at a pixel density of 8 pixels/mm with respect to the main scanning direction and at a pixel density of 200 pixels/inch with respect to the sub-scanning direction, but also the picture signal which is indicative of the picture image to be displayed at a pixel density of about 200 pixels/inch with respect to the main scanning direction and at a scanning line density of 200 lines/inch with respect to the sub-scanning direction, the picture signal which is indicative of the picture image to be displayed at a pixel density of 8 pixels/mm with respect to the main scanning direction and at a scanning line density of about 7.7 lines/mm with respect to the sub-scanning direction, and the picture signal which is indicative of the picture image to be displayed at a pixel density of about 200 pixels/inch with respect to the main-scanning direction and at a scanning line density o about 7.7 lines/mm with respect to the sub-scanning direction.

Figure 4:
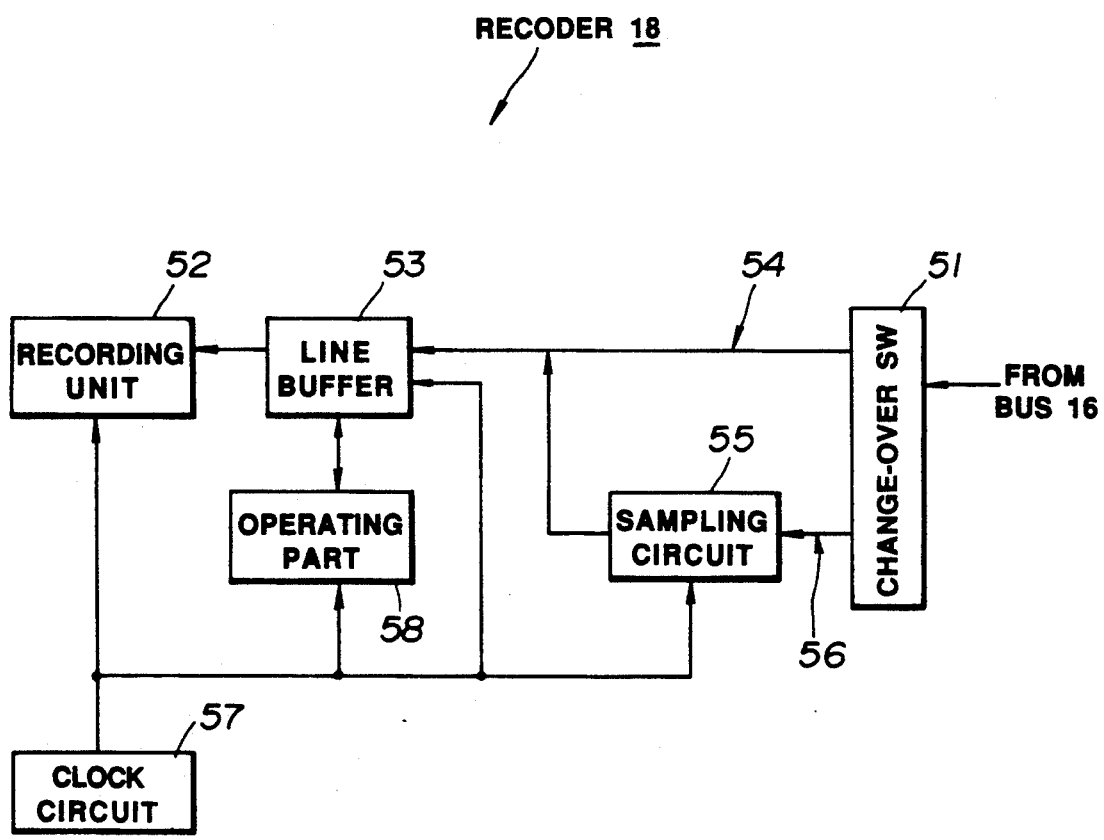
FIG. 4 is a block diagram of a recorder used in the facsimile machine of FIG. 2.

Referring next to FIG. 4, there is shown an arrangement of the recorder 18 used in FIG. 2. The recorder 18 functions to record on a recording paper a picture image to be displayed at a pixel density of 200 pixels/inch with respect to the main scanning direction and at a scanning line density of 7.7 lines/mm with respect to the sub-scanning direction.

In the drawing, a picture signal sent from the bus 16 of FIG. 2 is applied to a change-over switch 51 and further sent to a recording unit 52 through either one of two transmission paths 54 and 56. More specifically, the first transmission path 54 starts with the change over switch 51, passes through a line buffer 53 and ends with the recording unit 52; whereas the second transmission path 56 starts with the change-over switch 51, passes through a sampling circuit 55 and the line buffer 53, and ends with the recording unit 52. The unit 52, when receiving the picture signal in synchronism with a clock signal from a clock circuit 57, records a picture image corresponding to the picture signal on a recording paper based on, for example, the electrophotographic recording system. In this case, the picture resolution is 200 pixels/inch with respect to the main scanning direction and 7.7 lines/mm with respect to the sub-scanning direction.

In the case where a picture signal to be inputted to the recorder 18 from the bus 16 has a pixel density of 200 pixels/inch with respect to the main scanning direction and a scanning line density of 7.7 lines/mm with respect to the sub-scanning direction and thus it is unnecessary to subject the picture signal to an reduction processing with respect to the both directions, the controller 23 acts to change the change-over switch 51 to the first transmission path 54 side and to send the picture signal from the switch 51 via the line buffer 53 to the recording unit 52. That is, since the picture signal is inputted to the recording unit 52 with the original pixel density of 200 pixels/inch with respect to the main scanning direction and the original scanning line density of 7.7 lines/mm with respect to the sub-scanning direction, the corresponding picture image can be recorded at the recording unit 52 without any size expansion or contraction in both the main scanning and sub scanning directions.

Also, in the event where a picture signal inputted from the bus 16 to the recorder 18 has a pixel density of 8 pixels/mm with respect to the main scanning direction and a scanning line density of 7.7 lines/mm with respect to the sub scanning direction and thus it is necessary to transform from the metric unit system of the picture signal to the inch one with respect to the main scanning direction as shown in FIG. 1(c), the controller 23 functions to activate the sampling circuit 55 and also to change the change-over switch 51 to the second transmission path 56 for inputting the picture signal from the switch 51 to the sampling circuit 55 in the recorder 18. The sampling circuit 55, when receiving the picture signal, repeats such a series of operations that thin out 16 pixels from 1000 pixels in synchronism with the cock signal received from the clock circuit 57 in the same manner as mentioned above to thereby subject the received picture signal to a reduction processing having a reduction factor 98.4% substantially equivalent to the aforementioned equation (1). The picture signal, which has been subjected to the reduction processing with respect to the main scanning direction in this way, is supplied from the sampling circuit 55 via the line buffer 53 to the recording unit 52 without being subjected to any reduction processing with respect to the sub-scanning direction. The picture signal thus obtained can indicate a picture image to be recorded at a pixel density of about 200 pixels/inch with respect to the main scanning direction and at a scanning line density of 7.7 lines/mm with respect to the sub-scanning direction. For this reason, the size of the picture image recorded at the recording unit 52 having the similar picture resolution can be made to be the same as the original one with respect to both the main scanning and sub-scanning directions, thus eliminating the need for performing an expanding or contracting processing over the picture signal.

Further, in the case where a picture signal inputted from the bus 16 to the recorder 18 has a pixel density of 200 pixels/inch with respect to the main scanning direction and a scanning line density of 200 lines/inch with respect to the sub-scanning direction and thus it is necessary to transform from the inch unit system of the sub-scanning direction as shown in FIG. 1(d), the controller 23 functions to activate a operating part 58 and also to shift the change-over switch 51 to the first transmission path 54, thus supplying the picture signal from the switch 51 to the line buffer 53. The line buffer 53 in turn, when receiving the picture signal, once stores a part of the received picture signal corresponding to several lines on a sub-scanning direction line basis and sequentially outputs the already stored lines of the picture signal in the first stored order. The operating part 58, in synchronism with the clock signal from the clock circuit 57, repeats such a series o operations over the line buffer 53 that thin out 22 lines out of very 1000 lines in the same manner as mentioned above, whereby the picture signal is subjected to a reduction processing having a reduction factor 97.8% substantially equivalent to the aforementioned equation (4). The picture signal, which has been subjected to the reduction processing with respect to the sub-scanning direction in this way but has not been subjected to any reduction processing with respect to the main scanning direction, is sent from the line buffer 53 to the recording unit 52. This results in that the picture signal indicates a picture image to be recorded at a pixel density of 200 pixels/inch in the main scanning direction and at a scanning line density of about 7.7 lines/mm in the sub-scanning direction. For this reason, the size of the picture image recorded at the recording unit 52 having the similar picture resolution can be made to be the same as the original one with respect to both the main-scanning and sub scanning directions, thus eliminating the need for performing a expanding or contracting processing over the picture signal.

Further, in the case where a picture signal inputted from the bus 16 to the recorder 18 has a pixel density of 8 pixels/mm with respect to the main scanning direction and a scanning line density of 200 lines/inch with respect to the sub scanning direction and thus it is necessary to transform the metric unit system of the picture signal into the inch one with respect to the main scanning direction and also to transform the inch unit system of the picture signal into the metric one with respect to he sub-scanning direction as shown in FIG. 1(e), the controller 23 functions to activate the sampling circuit 55 and operating part 58 and also to shift the change-over switch 51 to the second transmission path 56, thus supplying the picture signal from the switch 51 to the sampling circuit 55. The sampling circuit 55 in turn, when receiving the picture signal, repeats such a series of operations that thin out 16 pixels out of every 1000 pixel s in the same manner as mentioned above to subject the picture signal to a reduction processing having a reduction factor 98.4% substantially equivalent to the aforementioned equation (1), and outputs the picture signal reduced in the main scanning direction. The outputted picture signal is then inputted to the line buffer 53 to be subjected at the operating part 58 to a reduction processing with respect to the sub scanning direction. That is, the operating part 52 repeats such a series of operations that thin out 22 lines out of every 1000 lines in the same manner as mentioned above to subject the picture signal to a reduction processing having a reduction factor 98.4% substantially equivalent to the equation (4). The picture signal, which has thus been subjected to the reduction processings with respect to both the main scanning and sub-scanning directions, indicates a picture image to be recorded at a pixel density of about 200 pixels/inch in the main scanning direction and at a scanning line density of about 7.7 lines/mm in the sub-scanning direction. For this reason, the size of the picture image recorded at the recording unit 52 having the similar picture resolution can be made to be the same as the original one with respect to the both main-scanning and sub scanning directions, thus eliminating the need for performing an expanding or contracting processing over the picture signal.

As explained in the foregoing, the recorder 18 is provided with the recording unit 52 which has a picture resolution of 200 pixels/inch in the main scanning direction and 7.7 lines/mm in the sub-scanning direction. As a result, the picture signals can be selectively inputted to the recording unit 52 in such a manner that the picture signal indicative of the picture image to be recorded at 200 pixels/inch with respect to the main scanning direction and at 7.7 lines/mm with respect to the sub-scanning direction is inputted to the recording unit 52 as it is without being subjected to any reduction processing, that the picture signal indicative of the picture image to be recorded at 8 pixels/mm with respect to the main scanning direction and at 7.7 lines/mm with respect to the sub-scanning direction is transformed to about 200 pixels/inch with regard to only the main scanning direction and then inputted to the recording unit 52, that the picture signal indicative of the picture image to be recorded at 200 pixels/inch with respect to the main scanning direction and at 200 lines/inch with respect to the sub-scanning direction is transformed into about 7.7 lines/mm with regard to only the sub scanning direction and then inputted to the recording unit 52, and that the picture signal indicative of the picture image to be recorded at 8 pixels/mm with respect to the main-scanning direction and at 200 lines/mm with respect to the sub-scanning direction is transformed into about 200 pixels/inch and about 7.7 lines/mm with regard to the both main-scanning and sub scanning directions and then inputted to the recording unit 52.

Although pixels have been simply thinned out in the reader 17 and recorder 18, the present invention is not restricted to the particular examples. For example, when a logical operation is performed between a value (one of two values indicative of white and black) of a pixel to be thinned out and a value of a pixel adjacent to the pixel to be thinned out in the main scanning direction to find a logical operational value and the logical operational value is set as the value of the adjacent pixel, information on the pixel to be thinned out can remain on the adjacent pixel without deleting the information completely. Similarly, when lines are not simply thinned out but a logical operation is carried out between a value of a pixe on a line to be thinned out and a value of a pixel adjacent to the pixel on the line to be thinned out in the sub-scanning direction to find a logical operational value and the logical operational value is set as the value of the adjacent value, information on the line to be thinned out can remain on the adjacent line without deleting the information completely.

With the facsimile machine having such an arrangement as mentioned above, when it is desired to transmit a signal from the machine, the controller 23 first causes the change-over switch 15 to be changed to the G4 communication controller 14 side to realize an interconnection between the G4 communication controller 14 and the line interface 11. And the controller 23 also acts to operate the line interface 11 and the G4 communication controller 14 and to inform the line interface 11 of such a transmission data as a dial number of the communication party. The line interface 11 in turn, when being informed from the controller 23, executes its call setting function over the SDN via the ISDN line 12 to call a communication terminal as the party.

Figure 5:
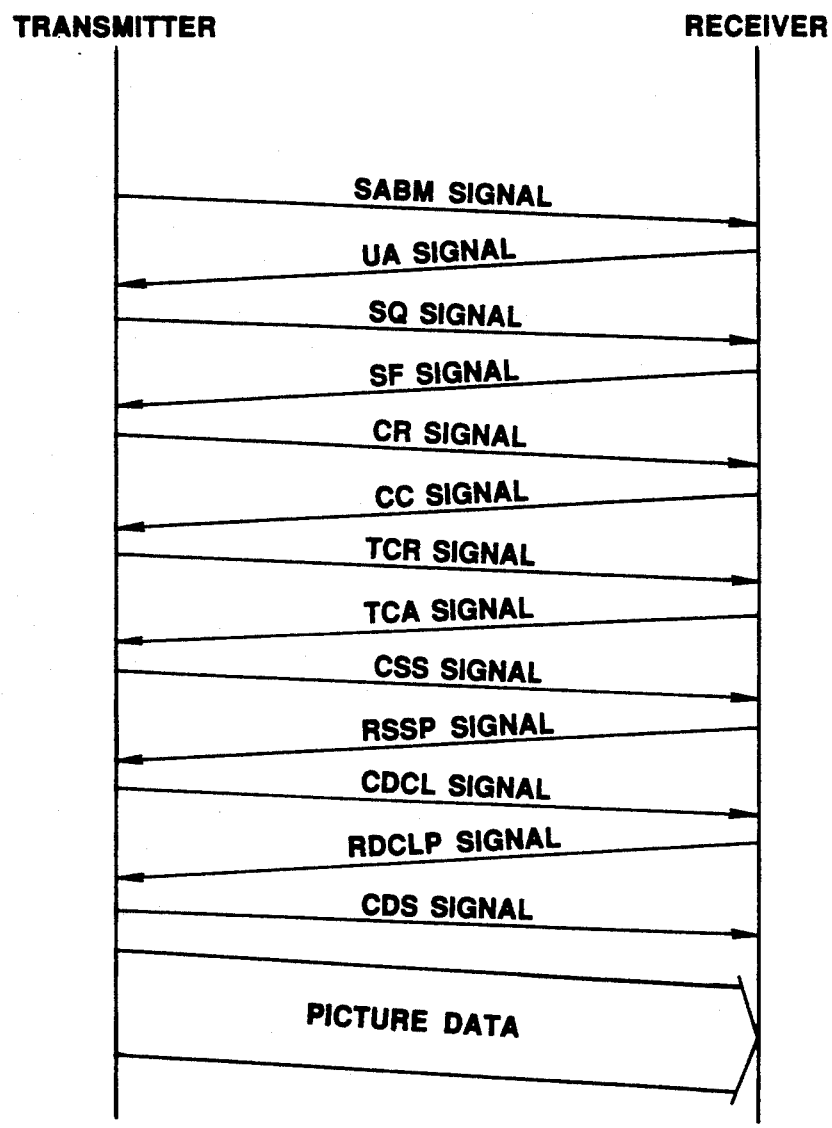
FIG. 5 is a diagram for explaining a G4 facsimile communication procedure.

At this time, when the party communication terminal responds to the calling, the line interface 11 connects the ISDN line 12 with the change-over switch 15. This causes the G4 communication controller 14 to be connected through the change-over switch 15 and line interface 11 to the ISDN line 12, so that the facsimile machine starts its communication with the party communication terminal. In this case, if the party communication terminal is a G4 facsimile machine, then such a G4 facsimile communication procedure recommended by the CCTT as shown in FIG. 5 is carried out between the caller and party facsimile machines and after the completion of this communication procedure, communication of picture data is started.

Figure 6:
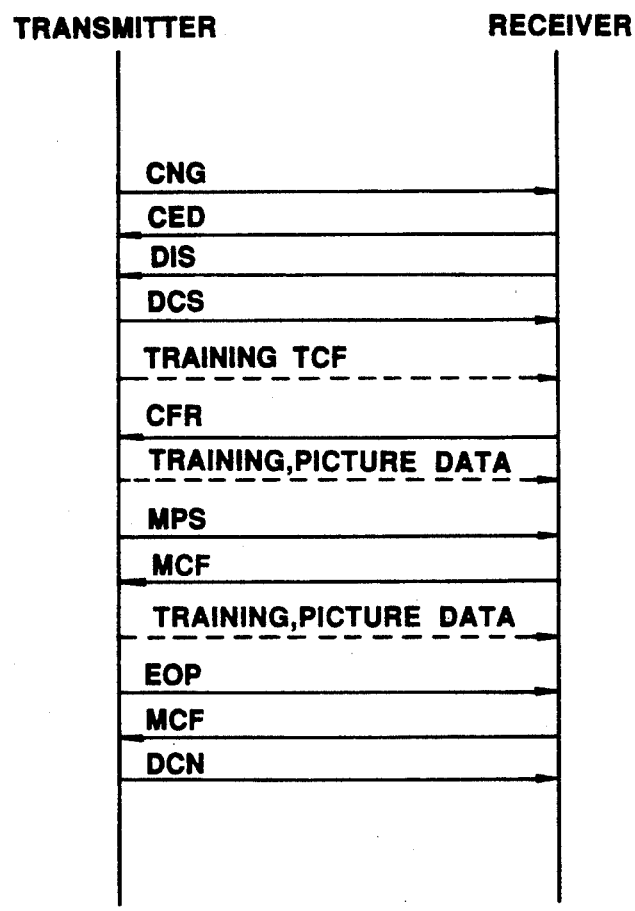
FIG. 6 is a diagram for explaining a G3 facsimile communication procedure.
Figure 7A:
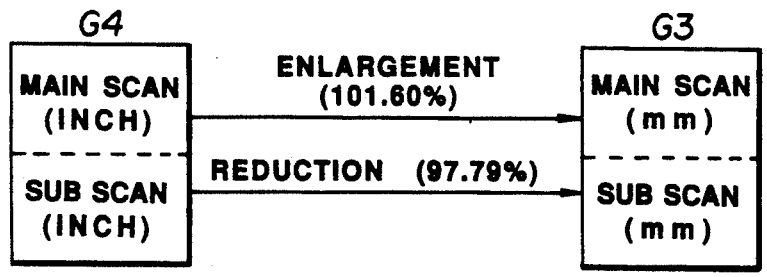
FIGS. 7(a) to 7(d) are diagrams for explaining an enlargement processing of a picture signal in prior art facsimile communication.
Figure 7B:
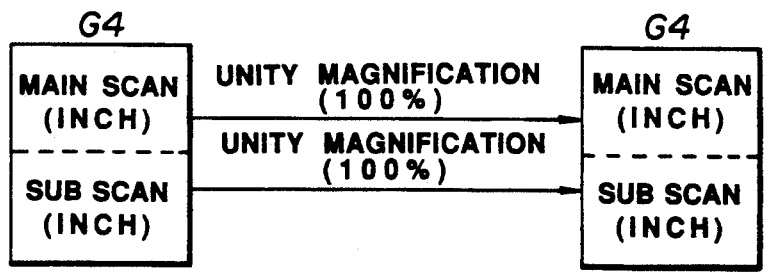
Figure 7C:
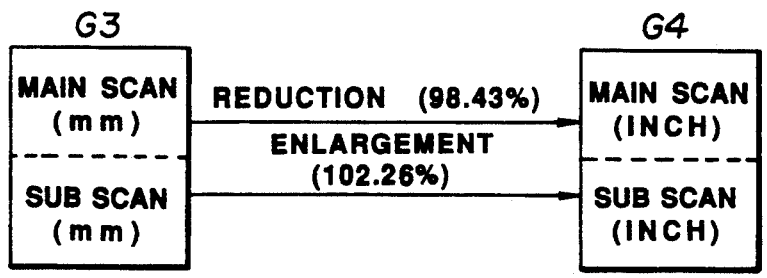
Figure 7D:
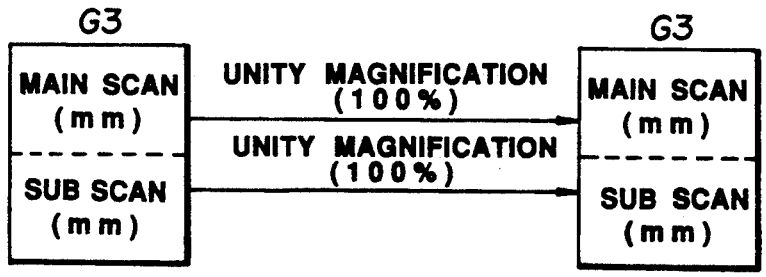
Figure 8:
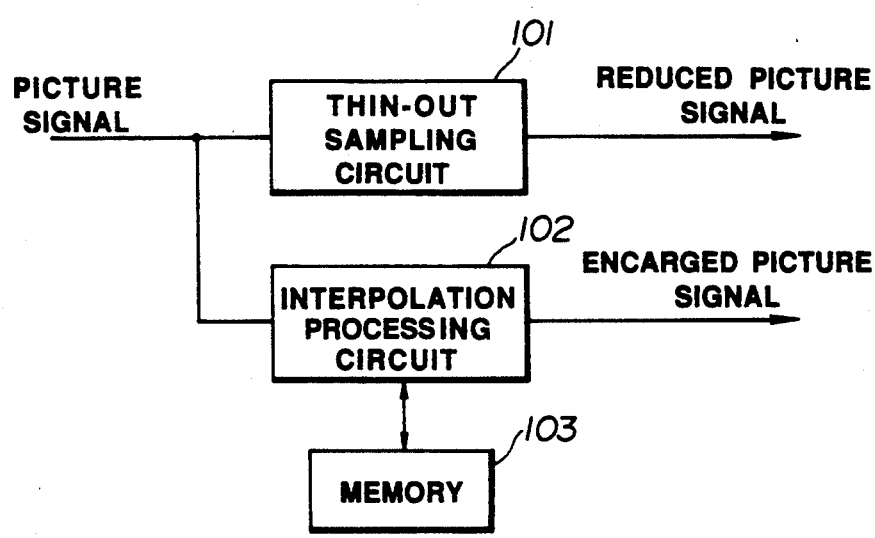
FIG. 8 is a block diagram exemplifying a circuit for performing enlargement and reduction processings with respect to a main scanning direction.

When the communication party is not a G4 facsimile machine, it is impossible to carry out the G4 facsimile communication procedure between the caller facsimile machine and the party terminal and thus picture data communication cannot be established and the line between the both is put in a cut-off state. Under such a condition, the controller 23 acts to change the change-over switch 15 to the G3 communication controller 13 side, thus establishing an interconnection between the G3 communication controller 13 and the line interface 11. And the controller 23 activates the line interface 11 and the G3 communication controller 13 to again call the party communication terminal through the line interface 11 as in the above case. At this time, when the party communication terminal answers to the calling, the interconnection control of the line interface 11 causes the G3 communication controller 13 to be connected to the ISDN line 12 through the change over switch 15 and the line interface 11, whereby the present caller facsimile machine starts its communication with the party terminal as in the above case. In this case, if the party communication terminal is a G3 facsimile machine, then such a G3 facsimile communication procedure recommended by the CCITT as shown in FIG. 6 is carried out between the caller and party facsimile machines and after the completion of this communication procedure, communication of picture data is started.

In this way, when the caller facsimile machine of the present invention tries to perform the G4 facsimile communication procedure with the party communication terminal but ends in a failure, the caller again tries to call the same party to perform the G3 facsimile communication procedure. This function is referred to as the fall back function. Thus, the use of the fall back function enables realization of the facsimile communication without any intervention of operator's complicated operations and regardless of the type, i.e., G4 or G3 of the party communication terminal.

Next, when the present facsimile machine receives an incoming signal, the line interface 11 first accepts a call setting message from the ISDN and starts its interconnection control procedure to be connected with the party communication terminal through the ISDN. At this time, the line interface 11 also informs the controller 23 of a transmission ability data included in the call setting message. The controller 23, when receiving the transmission ability data, determines on the basis of a transfer ability data contained in the transmission ability data, whether a data to be transmitted from the party communication terminal is digital data or 3.1 KHz audio data.

The controller 23, when determining that the party transmission data is digital data, changes the change-over switch 15 to the G4 communication controller 14 side and also activates the G4 communication controller 14, since the party communication terminal is a G4 facsimile machine. This causes the present facsimile machine as a receiver to start such a G4 facsimile communication procedure as shown in FIG. 5 with the party G4 facsimile machine as the caller. After completion of the communication procedure, the present receiver facsimile machine starts the picture data communication.

When the controller 23 determines that the party transmission data is 3.1 KHz audio data, on the other hand, the controller 23 shifts the change-over switch 15 to the G3 communication controller 13 side to activate the G3 communication controller 13, since the party communication terminal is a G3 facsimile machine. This causes the present facsimile machine as the receiver to start such a G3 facsimile communication procedure as shown in FIG. 6 with the party G3 facsimile machine as the caller. After completion of the communication procedure, the present receiver facsimile machine starts the picture data communication.

In this way, even when the facsimile machine receives an incoming signal or transmits an outgoing signal, it can identify the type of the facsimile machine of the party communication terminal, that is, G4 or G3 and can realize the picture data communication.

When it is desired to carry out such a G4 facsimile communication procedure as shown in FIG. 5, the present facsimile machine transmits and receives signals CDCL and RDCLP indicative of the size of transmission documents, picture resolution and so on as well as a signal CDS for confirming these signals CDCL and RDCLP, whereby the controller 23 can confirm the pixel density, scanning line density and so on of picture data transferred through the G4 communication controller 14.

When it is also desired to carry out such a G3 facsimile communication procedure as shown in FIG. 6, the present facsimile machine transmits and receives signals DIS and DCS, whereby the controller 23 can confirm the pixel density, scanning line density and so on of picture data transferred through the G3 communication controller 13.

Next, consider the case where the party communication terminal has substantially the same arrangement as the present facsimile machine and thus includes the reader 17 and the recorder 18. Then the present facsimile machine, when executing the interconnection control procedure through the ISDN as mentioned above, transmits and receives a call setting message including a desired user data and a response message to and from the party terminal, thereby confirming that the party terminal has the same arrangement as the present facsimile machine. More specifically, the present facsimile machine transmits and receives the call setting message including user data indicative of the picture resolution of the reader 17 and the picture resolution of the recorder 18 as well as the response message to and from the party, thus confirming that the party terminal has the same arrangement as the present facsimile machine.

In the case where it is desired to transmit a picture data from the present facsimile machine 1 to the G3 facsimile machine 3 as shown in FIG. 1(a), the controller 23 confirms, on the basis of the establishment of the facsimile communication procedure through the G3 communication controller 13, that the party communication party is the G3 facsimile machine 3. And the controller 23 also confirms, on the basis of the signals DIS and DCS transmitted and received according to such a G3 facsimile communication procedure as shown in FIG. 6, that the G3 facsimile machine 3 has picture resolutions of, for example, 8 pixels/mm in the main scanning direction and 7.7 lines/mm in the sub-scanning direction. After such confirmation, the controller 23 activates the sampling circuit 38 in the reader 17 of FIG. 3 and also shifts the change-over switch 36 to the second transmission path 42 side to reduce the output picture signal of the binary processor 35 to 97.8% with respect to the sub-scanning direction. This results in that a picture signal indicative of a picture resolution of 8 pixels/mm in the main scanning direction and about 7.7 lines/mm in the sub-scanning direction is sent onto the bus 16 and also once stored in the picture memory 19. The encoder/decoder 20 encodes the picture signal in the picture memory 19 into a coded picture signal and sends the coded picture signal onto the bus 16. The coded picture signal is then transmitted to the SDN line 12 and further to the party G3 facsimile machine 3 by way of a route of bus 16→G3 communication controller 13→change over switch 15→line interface 11. The facsimile machine 3 in turn, when receiving the coded picture data, decodes the signal to obtain a picture signal indicative of picture resolutions of the metric unit both in the main-scanning and sub-scanning directions, thus resulting in that a picture corresponding to the decoded signal can be recorded on a recording paper and thus can have a size compatibility with the sender on the receiver side.

In the event where it is desired to transmit a picture signal from the present facsimile machine 1 to the G4 facsimile machine 4 as shown in FIG. 1(b), the controller 23 confirms, on the basis of the establishment of the facsimile communication procedure through the G4 communication controller 14, that the party communication party is the G4 facsimile machine 4. And the controller 23 also confirms, on the basis of the signals CDCL, RDCLP and CDS transmitted and received according to such a G4 facsimile communication procedure as shown in FIG. 5, that the G4 facsimile machine 4 has a picture resolution of, for example, 200 pixels/inch in the main scanning direction and 200 lines/inch in the sub-scanning direction. After such confirmation, the controller 23 shifts the change-over switch 36 in the reader 17 of FIG. 3 to the first transmission path 41 side and also activates the operating part 40 to thereby reduce the output picture signal of the binary processor 35 to 98.4% with respect to the main scanning direction. This results in that a picture signal indicative of a picture resolution of about 200 pixels/inch in the main scanning direction and 200 lines/inch in the sub-scanning direction is sent onto the bus 16 and also once stored in the picture memory 19. The encoder/decoder 20 encodes the picture signal in the picture memory 19 into a coded picture signal and sends the coded picture signal onto the bus 16. The coded picture signal s then transmitted to the SDN line 12 and further to the party G4 facsimile machine 4 by way of a route of bus 16→G4 communication controller 14→change-over switch 15→line interface 11. The facsimile machine 4 in turn, when receiving the coded picture signal, decodes the received signal to obtain a picture signal indicative of picture resolutions of the inch unit both in the main-scanning and sub scanning directions, thus resulting in that a picture corresponding to the decoded signal can be recorded on a recording paper and thus can have a size compatibility with the sender on the receiver side.

In the case where it is desired to transmit a picture signal from the G3 facsimile machine 3 to the present facsimile machine 2 as shown in FIG. 1(c), the controller 23 confirms, on the basis of the establishment of the facsimile communication procedure through the G3 communication controller 13, that the party communication party is the G3 facsimile machine 3. And the controller 23 also confirms, on the basis of the signals DIS and DCS transmitted and received according to such a G3 facsimile communication procedure as shown in FIG. 6, that the G3 facsimile machine 3 has a picture resolution of, for example, 8 pixels/mm in the main scanning direction and 7.7 lines/mm in the sub-scanning direction. After such confirmation, the controller 23 activates the operating part 58 in the recorder 18 of FIG. 4 and also shifts the change-over switch 51 to the first transmission path 54 side. Thereafter, when the present facsimile machine 2 receives the picture signal from the G3 facsimile machine 3, the picture signal is once stored in the picture memory 19 by way of a route of line interface 11→change-over switch 15 G3 communication controller 13→bus 16. The picture signal in the memory 19 is decoded at the encoder/decoder 20, which signal in turn is inputted to the recorder 18. In the recorder 18, the change-over switch 51 is shifted to the first transmission path 54 side to input the picture signal from the bus 16 to the line buffer 53 as mentioned above. The operating part 58 reduces the picture signal in the line buffer 53, which has a picture resolution of 8 pixels/mm in the main scanning direction and 7.7 lines/mm in the sub-scanning direction, to 98.4% in the main scanning direction; thereby generating a picture signal having a picture resolution of about 200 pixels/inch in the main scanning direction and 7.7 lines/mm in the sub-scanning direction. The picture signal thus obtained is inputted to the recording unit 52 which has a picture resolution of 200 pixels/inch in the main scanning direction and 7.7 lines/mm in the sub scanning direction, where a picture corresponding to the decoded signal can be recorded on a recording paper with a picture size compatible with the sender.

In the event where it is desired to transmit a picture signal from the G4 facsimile machine 4 to the present facsimile machine 2 as shown in FIG. 1(d), the controller 23 confirms, on the basis of the establishment of the facsimile communication procedure through the G4 communication controller 14, that the party communication party is the G4 facsimile machine 4. And the controller 23 also confirms, on the basis of the signals CDCL, RDCLP and CDS transmitted and received according to the G4 facsimile communication procedure, that the G4 facsimile machine 4 has a picture resolution of, for example, 200 pixels/inch in the main scanning direction and 200 lines/inch in the sub scanning direction. After such confirmation, the controller 23 activates the sampling circuit 55 in the recorder 18 of FIG. 4 and also shifts the change-over switch 51 to the second transmission path 56. Thereafter, when the present facsimile machine 2 receives the picture signal from the G4 facsimile machine 4, the picture signal is once stored in the picture memory 19 by way of a route of line interface 11→change-over switch 15→G4 communication controller 14 . bus 16. The picture signal in the memory 19 is decoded at the encoder/decoder 20, which signal in turn is inputted to the recorder 18. In the recorder 18, the change-over switch 51 is shifted to the second transmission path 56 side to input the picture signal from the bus 16 to the sampling circuit 55 as mentioned above. The sampling circuit 55 reduces the picture signal, which has a picture resolution of 200 pixels/inch in the main scanning direction and 200 lines/inch in the sub scanning direction, to 97.8% in the main scanning direction; thereby generating a picture signal having a picture resolution of 200 pixels/inch in the main scanning direction and about 7.7 lines/mm in the sub-scanning direction. The picture signal thus obtained is inputted to the recording unit 52 which has a picture resolution of 200 pixels/inch in the main scanning direction and 7.7 lines/mm in the sub-scanning direction, where a picture corresponding to the decoded signal can be recorded on a recording paper with a picture size compatible with the sender.

Next, in the case where it is desired to transmit a picture signal from the first facsimile machine 1 to the second facsimile machine 2, the both machines having the same arrangement, as shown in FIG. 1(e); when the interconnection control procedure is required between the both facsimile machines through the ISDN as mentioned above, the controller 23 of each of the both machines determines that the party facsimile machine has the reader 17 and the recorder 18 each having the same picture resolution, and performs the G4 facsimile communication procedure.

When, for example, the first facsimile machine 1 as a signal sender is previously set to carry out the picture solution transformation, the controller 23 of the first facsimile machine 1 acts to activate the operating part 40 and sampling circuit 38 in FIG. 3 and also to shift the change-over switch 36 to the second transmission path 42 side, whereby the picture signal issued from the binary processor 35 is reduced to 98.4% in the main scanning direction and to 97.8% in the sub-scanning direction. As a result, there can be obtained a picture signal which has a picture resolution of about 200 pixels/inch in the main scanning direction and about 7.7 lines/mm in the sub-scanning direction. This picture signal is encoded and in turn is transmitted to the second facsimile machine 2. The second facsimile machine 2, when receiving encoded picture signal, decodes the received picture signal resulting in a picture signal which has a resolution of about 200 pixels/inch in the main scanning direction and about 7.7 lines/mm in the sub-scanning direction. The decoded picture signal is not subjected to any reduction processing and inputted to the recording unit 52 in the recorder 18 as it is. Since the recording unit 52 has a picture resolution of the metric unit with respect to both the main-scanning and sub-scanning direction, a picture having a size compatible with that on the sender side can be recorded on the basis of the picture signal.

When, rather than the first facsimile machine 1 of the sender side, the second facsimile machine 2 of the receiver side is previously set to perform the picture resolution transformation, the first machine 1 encodes the picture signal while not performing any reduction processing over the picture signal. The obtained encoded picture signal is transmitted to the second facsimile machine 2. When receiving the encoded picture signal, the second facsimile machine 2 decodes the same into a picture signal which in turn is inputted to the recorder 18. In the recorder 18, the operating part 58 and sampling circuit 55 shown in FIG. 4 are activated and the change-over switch 51 is shifted to the second transmission path 56 under the control of the controller 23, so that the picture signal is reduced to 98.4% in the main scanning direction and to 97.8% in the sub scanning direction. This results in that there can be obtained a picture signal which has a picture resolution of about 200 pixels/inch in the main scanning direction and 7.7 lines/mm in the sub-scanning direction. The obtained picture signal is inputted to the recording unit 52 where a picture corresponding to the picture signal and having a size compatible with that on the sender is recorded.

As has been explained in the foregoing, in accordance with the facsimile machine of the present invention, even when the party communication terminal has a picture resolution of the metric unit in the both main-scanning and sub-scanning directions or has a picture resolution of the inch unit in the both main-scanning and sub-scanning directions, or even when the party communication terminal has the same arrangement as the present invention; picture size compatibility therebetween can be secured only by performing the reduction processing over the picture signal with respect to either one or both of the main-scanning and sub-scanning directions. That is, the present invention can eliminate the need for any enlargement processing, can avoid the deterioration of data caused by the enlargement processing, and can eliminate the need for provision of a circuit for the enlargement processing.

What is claimed is:

1. A reader for use in a first facsimile machine, the reader comprising:

means for scanning a document in a main-scanning direction to produce a main-scanning direction component of a picture signal, the main-scanning direction component being expressed in terms of G3 pixels/mm based on a metric unit system, and for scanning a document in a sub-scanning direction perpendicular to the main-scanning direction to produce a sub-scanning direction component of the picture signal, the sub-scanning direction component being expressed in terms of G4 lines/inch based on an inch unit system;

means for transmitting the picture signal to a second facsimile machine; and means for performing a reduction processing on the main-scanning direction component of the picture signal when the second facsimile machine is adapted to receive a main-scanning direction component of a picture signal expressed in terms of G4 pixels/inch based on an inch unit system, and for performing a reduction processing on the sub-scanning direction component of the picture signal when the second facsimile machine is adapted to receive a sub-scanning direction component of a picture signal expressed in terms of G3 lines/mm based on a metric unit system.

2. A recorder for use in a first facsimile machine, the recorder comprising:

means for receiving a picture signal from a second facsimile machine, the picture signal having a main-scanning direction component and a sub-scanning direction component; and means for performing a reduction processing on the main-scanning direction component of the picture signal produced by the second facsimile machine when the main-scanning direction component of the picture signal is expressed in terms of G3 pixels/mm based on a metric unit system, and for performing a reduction processing on the sub-scanning direction component of the picture signal produced by the second facsimile machine when the sub-scanning direction component of the picture signal is expressed in terms of G4 lines/inch based on an inch unit system.

3. A reader/recorder for use in a first facsimile machine, the reader/recorder comprising:

means for scanning a document in a main-scanning direction to produce a main-scanning direction component of a picture signal, the main-scanning direction component being expressed in terms of G3 pixels/mm based on a metric unit system, and for scanning the document in a sub-scanning direction perpendicular to the main-scanning direction to produce a sub-scanning direction component of the picture signal, the sub-scanning direction component being expressed in terms of G4 lines/inch based on an inch unit system;

means for transmitting the picture signal produced by the first facsimile machine to a second facsimile machine;

means for performing a reduction processing on the main-scanning direction component of the picture signal when the second facsimile machine is adapted to receive a main-scanning direction component of a picture signal expressed in terms of G4 pixels/inch based on an inch unit system, and for performing a reduction processing on the sub-scanning direction component of the picture signal when the second facsimile machine is adapted to receive a sub-scanning direction component of a picture signal expressed in terms of G3 lines/mm based on a metric unit system;

means for receiving a picture signal transmitted by the second facsimile machine, the picture signal from the second facsimile machine having a main-scanning direction component and a sub-scanning direction component; and means for performing a reduction processing on the main-scanning direction component of the picture signal produced by the second facsimile machine when the main-scanning direction component of the picture signal is expressed in terms of G3 pixels/mm based on a metric unit system, and for performing a reduction processing on the sub-scanning direction component of the picture signal produced by the second facsimile machine when the sub-scanning direction component of the picture signal is expressed in terms of G4 lines/inch based on an inch system.

4. The reader/recorder of claim 3, further comprising:

means for receiving data from the second facsimile machine indicating how the main-scanning and sub-scanning components of the picture signal produced by the second facsimile machine are expressed; and means for transmitting data to the second facsimile machine indicating how the main-scanning and sub-scanning components of the picture signal produced by the first facsimile machine are expressed.

* * * * *